United States Patent [19]
Wu

[11] Patent Number: 5,467,838
[45] Date of Patent: Nov. 21, 1995

[54] AUTOMATICALLY DEPLOYABLE VEHICLE STABILIZATION SYSTEM

[76] Inventor: Donald P. H. Wu, 169 Ken Tzu Ku-Shang Ken Tsun, Hsin Feng Hsiang, Taiwan

[21] Appl. No.: 183,674

[22] Filed: Jan. 19, 1994

[51] Int. Cl.⁶ .................................................. B62D 61/12
[52] U.S. Cl. ........................... 180/209; 280/755; 280/767
[58] Field of Search ................................ 280/755, 763.1, 280/767, 901, 293, 295, 301, 302; 180/209, 210

[56] References Cited

U.S. PATENT DOCUMENTS

| | | | |
|---|---|---|---|
| 3,236,323 | 2/1966 | Austin | 180/209 |
| 3,362,726 | 1/1968 | Bell | 180/209 |
| 5,181,740 | 1/1993 | Horn | 280/755 |
| 5,257,671 | 11/1993 | Watkins | 180/209 |

FOREIGN PATENT DOCUMENTS

| | | | |
|---|---|---|---|
| 1110323 | 2/1956 | France | 180/209 |
| 451961 | 11/1949 | Italy | 180/209 |

OTHER PUBLICATIONS

Electric Mobility, Brochure, Date Unknown.
Amigo Mobility International, Inc., Brochure, Date Unknown.

Primary Examiner—Robert J. Oberleitner
Assistant Examiner—Lee W. Young
Attorney, Agent, or Firm—Foster & Foster; L. Grant Foster

[57] ABSTRACT

An automatically deployable vehicle stabilization system comprising a pair of stability arms pivotally coupled to a vehicle frame. The stability arms are fixedly coupled to a pivot bar. A drive mechanism interconnecting the pivot arms with a steering column of the vehicle causes the stability arms to pivot into extended positions when the front vehicle tire is turned. The stability arms prevent the vehicle from overturning when in operation. When the front vehicle tire is returned to its normal position, the stability arms retract so they do not bump into low-profile objects in the path of the vehicle. Alternatively, the stability arms can be locked into extended positions, if desired.

20 Claims, 8 Drawing Sheets

AUTOMATICALLY DEPLOYABLE VEHICLE STABILIZATION SYSTEM

TECHNICAL FIELD

The present invention relates to vehicle stabilization systems, and, more particularly, to stabilization systems for preventing vehicles from overturning when in operation.

BACKGROUND OF THE INVENTION

Vehicle stability is a primary consideration in the design of any vehicle. Vehicle stability is a concern for both three-wheel vehicles and four-wheel vehicles. A vehicle stabilization system must prevent the vehicle from overturning during operation, especially when the vehicle is negotiating a corner.

Three-wheel vehicles are more likely to experience stability problems during operation than four-wheel vehicles. The lack of a second front wheel leaves a three-wheel vehicle vulnerable to overturning when making a turn.

Three-wheel vehicles have, however, certain advantages as compared to four-wheel vehicles. Some of the biggest advantages include ease of maneuverability and a smaller turning radius. In addition, three-wheel vehicles are lighter and easier to transport than four-wheel vehicles.

In the last several years, specialized vehicles—electrically powered personal mobility vehicles ("scooter vehicles")—have been developed for use by elderly, infirm, and disabled persons. These scooter vehicles are small and lightweight, and can dramatically improve the style of life available to elderly, infirm, and disabled persons. These scooter vehicles provide such persons with a high degree of mobility independence that may not otherwise be available.

Suitable scooter vehicles for use by elderly, infirm, and disabled persons present unique design and manufacturing challenges. For example, an ideal scooter vehicle must be small and compact. Preferably, a scooter vehicle should have the capability of being broken down into a few parts so that it can be transported, for example, inside the trunk of an automobile. An ideal scooter vehicle should also be lightweight to enable the user to lift, position, and manually move the scooter vehicle with little physical effort. An ideal scooter vehicle must further be powerful enough to travel up hills while maintaining a certain minimum speed, yet must be geared to move slowly and controllably down hills. Moreover, a preferred scooter vehicle must be designed to remain stable at all times when in operation. There are still other design requirements, beyond those described above, that are uniquely tied to a suitable electrically powered scooter vehicle.

Maintaining vehicle stability during all phases of scooter vehicle operation is a constant design challenge, particularly with respect to three-wheel scooter vehicles. A three-wheel scooter vehicle is more apt to tip over when maneuvering through a turn than a four-wheel scooter vehicle.

When a scooter vehicle is turning, similar to any vehicle, an overturning moment or force is generated which causes the vehicle to lean toward the outside of the turn. Another potential tipping situation occurs when the vehicle is traveling along or traversing the side of a hill, with the overturning force urging the vehicle to tip toward the downhill side. In either situation, the overturning force increases in magnitude as the speed of the vehicle increases. In addition, the higher the profile of the load on the scooter vehicle, the greater the magnitude of the overturning moment. Furthermore, the attitude of the vehicle will also have an effect on the overturning force experienced by the vehicle. If this overturning force becomes too great, the vehicle will tip about an axis formed between the front wheel and the rear wheel at the outside of the turn.

Training wheel-like devices have been developed to prevent three-wheel scooter vehicles from tipping over when they experience a sufficiently strong overturning force during a turn. Known training wheel-like devices are rigidly mounted to the front of the vehicle on each side of the main front wheel in fixed, constantly extended positions.

These known training wheel-like devices function essentially the same as training wheels on a bicycle. When the scooter vehicle experiences a tipping force of sufficient magnitude, the vehicle tips to one side and the weight of the vehicle becomes partially borne by the training wheel to prevent the vehicle from completely tipping over. After the turn is completed, the vehicle will rock back with the front vehicle tire resuming its role to bear all of the vehicle's forward weight.

Known training wheel-type devices have, however, several drawbacks. Because they are rigidly affixed to the scooter, they constantly remain in a downward extended position. As such, the training wheel legs provide little clearance between the bottom of the training wheel and the top of the ground. The constantly extended training wheels continually hit objects, even relatively low profile objects, in the path of the scooter vehicle.

Thus, there is a need to develop a stabilization device for scooter vehicles that will overcome the above described problems with respect to vehicle tipping, yet that will avoid the interference problems presented by the training wheel-type devices described above. The present invention overcomes the foregoing problems by providing an automatically deployable vehicle stabilization system which becomes effective only when the vehicle is turning. The various features, advantages, and objects of the invention will become apparent from the detailed disclosure that follows.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention relates to stabilization devices for use in connection with vehicles. Preferred embodiments of the invention have been particularly adapted for use in connection with personal mobility vehicles ("scooter vehicles") for use by elderly, disabled, and infirm persons. It is to be understood, however, that the present invention may also be used in connection with other recreational type vehicles as well. Although the preferred embodiments of the invention are shown in the drawings as being used in connection with three-wheel scooter vehicles, the invention is also suitable for use in connection with four-wheel scooter vehicles.

Figure 1:
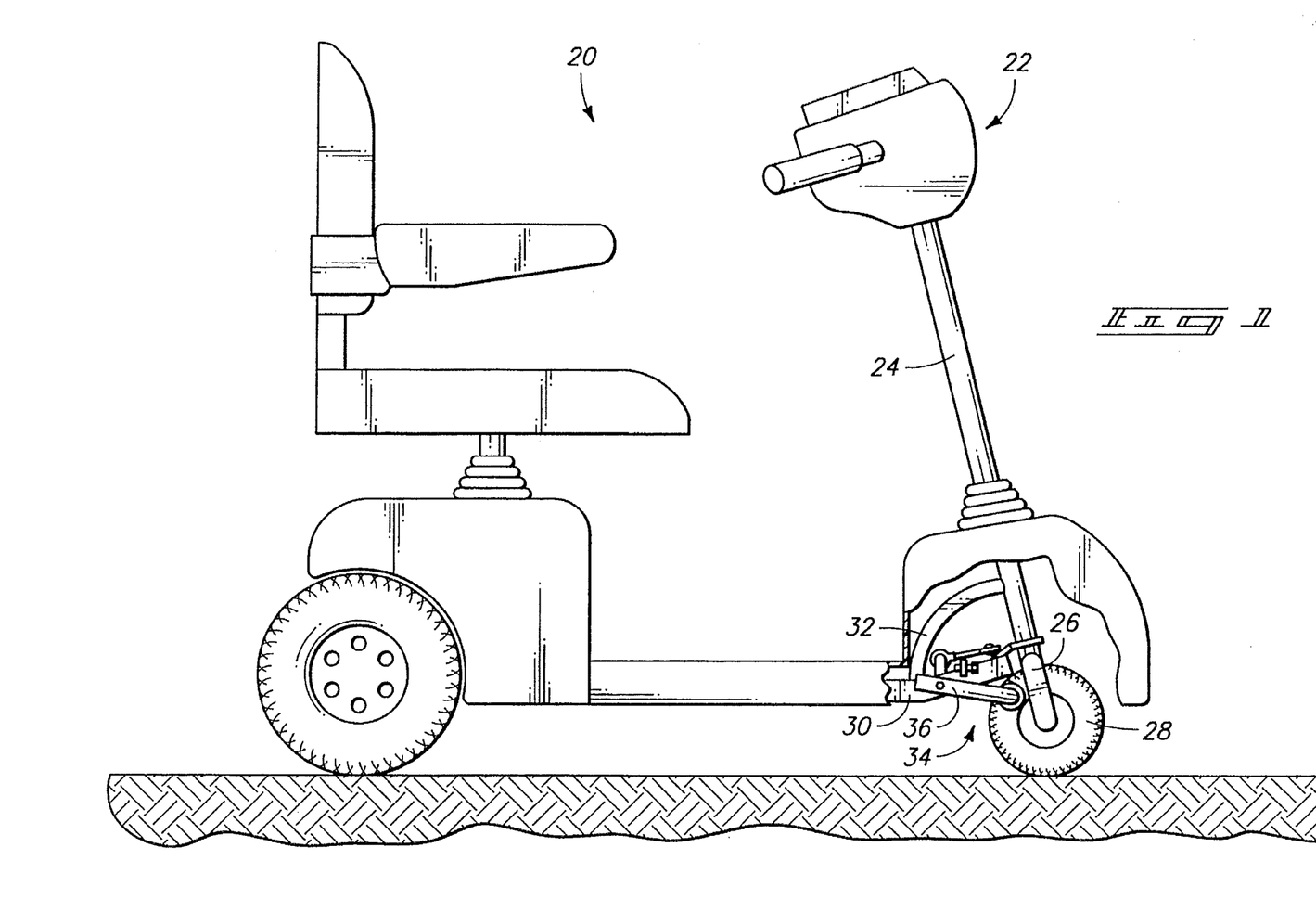
FIG. 1 is a side elevation view of a personal mobility vehicle including the automatically deployable vehicle stabilization system of the present invention.

FIG. 1 shows one preferred embodiment of an automatically deployable vehicle stabilization system 34 according to the present invention. The stabilization system 34 is shown mounted on a three-wheel scooter vehicle 20. The scooter vehicle 20 includes a steering mechanism 22 including a steering column 24 which terminates at a front fork 26. A front wheel 28 of the scooter vehicle is rotatably mounted to the fork member 26. A column mounting member 32 fixedly attaches the steering column 24 to the main portion of frame 30.

With reference to FIGS. 1–5, a vehicle stabilizing system 34 is pivotally coupled to the vehicle frame 30. The vehicle stabilizing system 34 includes a first stability or pivot arm 36 and a second stability or pivot arm 38. The first stability arm 36 and second stability arm 38 each have distal ends to which respective first and second stability wheels 40, 42 are rotatably attached. The stability wheels 40, 42 are intended to partially bear the weight of the scooter vehicle 20 when the arms 36, 38 are in extended positions and the vehicle tips to one side or the other. In such an event, the stability wheels would rotate upon engaging the ground surface and allow the vehicle to continue to move in its intended path without overturning.

The first stability arm 36 and the second stability arm 38 are fixedly coupled to a pivot bar 52 (FIGS. 2, 4, and 5) which, in turn, is rotatably coupled to and supported by the frame 30. Therefore, rotation of the pivot bar 52 likewise causes the first stability arm 36 and second stability arm 38 to pivot between retracted and extended positions.

Figure 2:
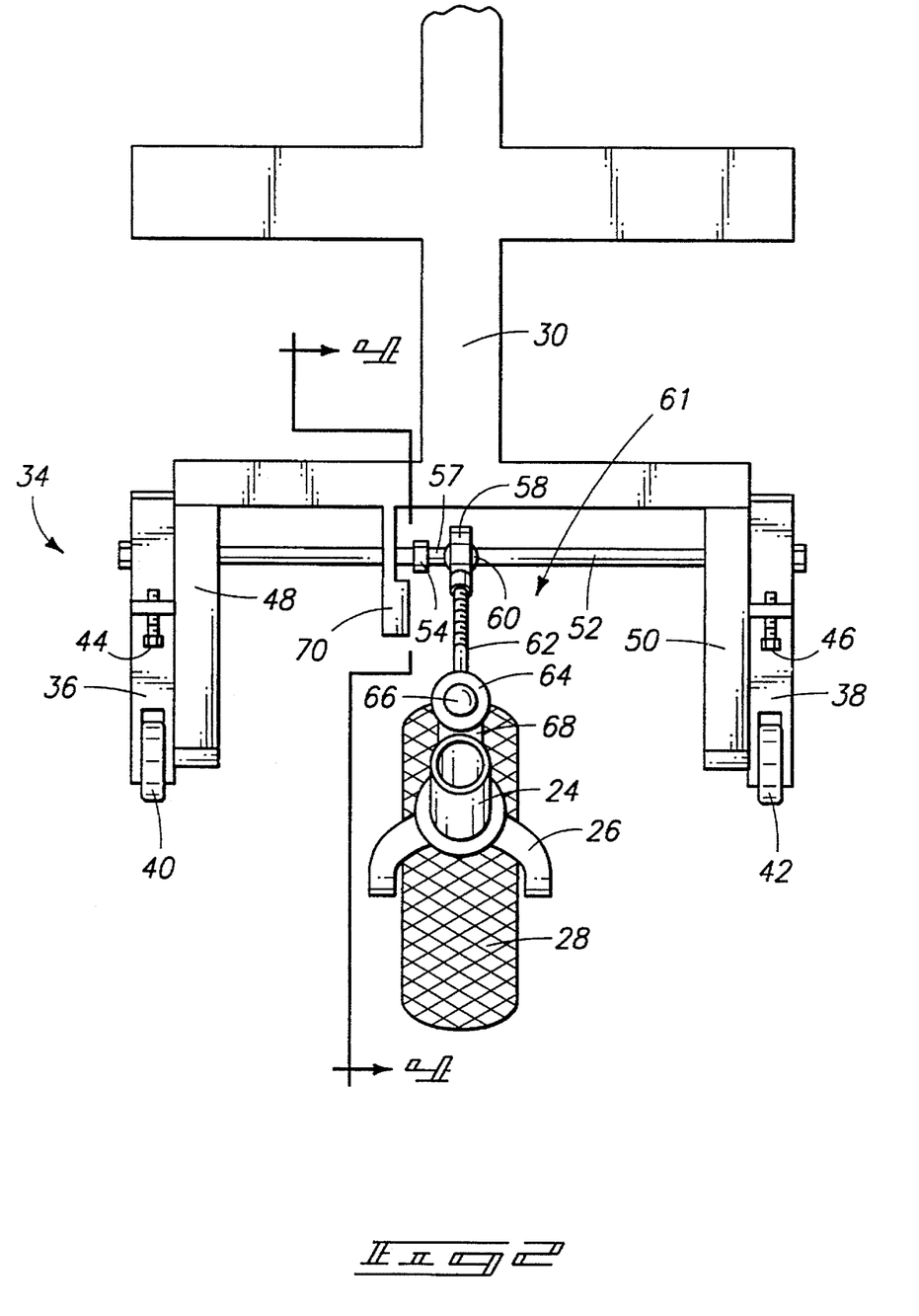
FIG. 2 is a top view of a first embodiment of an automatically deployable vehicle stabilization system according to the present invention.

The main vehicle frame 30 includes a first frame extension member 48 and a second frame extension member 50, both extending toward the forward end of the vehicle. The frame extension members 48, 50 are intended to provide structural support for the areas where the vehicle operator's feet will rest.

A first adjustable stop 44 is threadably secured to a flange extending from the first frame extension piece 48. A second adjustable stop 46 is similarly threadably attached to a flange extending from the second frame extension piece 50. The stops 44, 46 are adjustable and provide an abutment surface for the stability arms 36, 38 to prevent the stability arms from rotating beyond desired extended positions.

In one embodiment, the steering column 24 and the pivot rod 52 are connected to one another by means of a linkage assembly 61. The linkage assembly 61 includes a first ball-and-socket connection comprising a first ball portion 60 formed on a stem piece 57 (FIG. 3) which is fixedly attached to a pivot lever 54. The first ball portion 60 is rotatably and pivotally received by a first socket member 58 for movement relative thereto.

Figure 3:
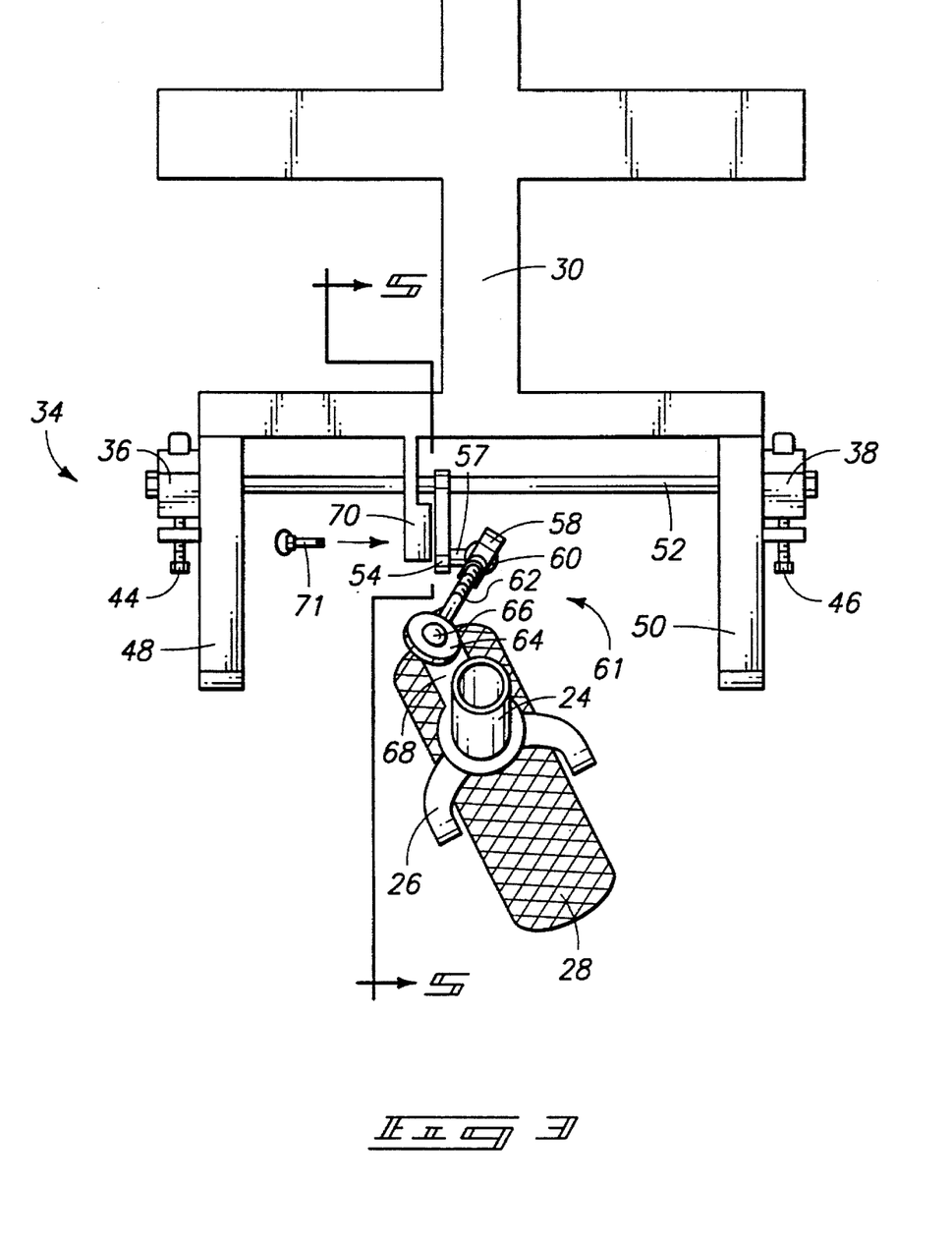
FIG. 3 is another top view of the vehicle stabilization system of FIG. 2 showing the front wheel in a turned position.

The linkage assembly 61 further comprises an adjustable control rod 62 threadably coupled to the first socket member 58 at one end. The length of the control rod 62 can be adjusted by rotating the threaded portion of control arm 62 relative to the first socket member 58.

Figure 4:
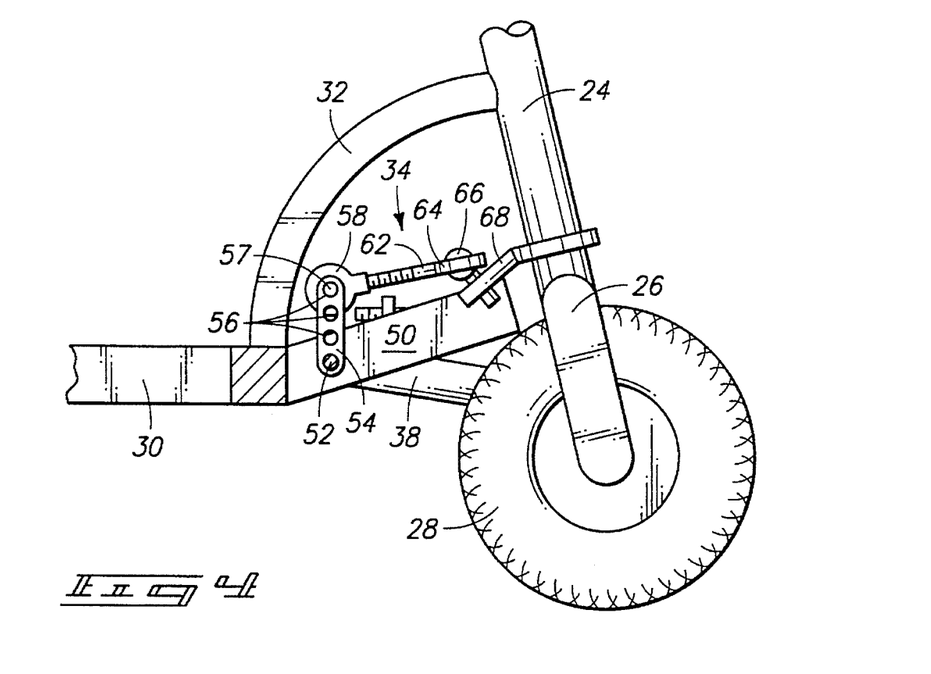
FIG. 4 is a side elevation view, taken along the line 4—4 of FIG. 2, of the vehicle stabilization system of FIG. 2.
Figure 5:
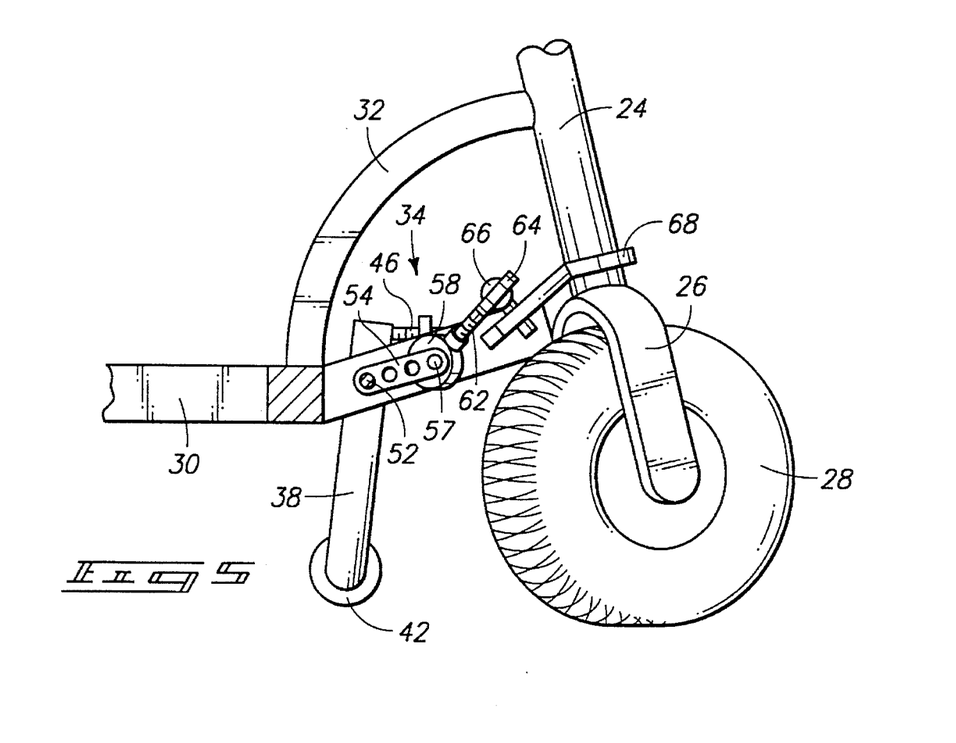
FIG. 5 is a side elevation, taken along the line 5—5 of FIG. 3, of the vehicle stabilization system of FIG. 2.

The linkage assembly still further comprises a second ball-and-socket connection comprising a second socket member 64 fixedly coupled to an end of the control rod 62 opposite the first socket member 58. A second ball portion 66 is formed on a second stem piece (unnumbered) which, in turn, is rigidly attached to a column extension member 68 (FIGS. 4 and 5). The column extension member 68 is fixedly secured to the steering column 24. The second ball portion is rotatably and pivotally coupled to the second socket member 64.

When the vehicle tire is turned in either direction (e.g., as shown in FIG. 3), the linkage assembly 61 pulls the pivot lever 54 in a downward direction. This simultaneously causes the pivot bar 52 and attached stability arms 36, 38 to rotate in a downward direction. Thus, the stability arms rotate between fully retracted positions (FIG. 4) and fully extended positions (FIG. 5). The fully extended positions are determined by the position of adjustable stops 44, 46 (only 46 is shown in FIG. 5). The upper end portions of the stability arms 36, 38, which rotate above the pivot bar 52, engage the stops 44, 46 at the fully extended positions.

The combination of the first and second ball-and-socket connections enables the linkage assembly to move and rotate the pivot bar 52 regardless of the direction the vehicle is turned. The stability arms 36, 38 move into extended positions only when the vehicle is negotiating a turn (FIGS. 3 and 5). After the turn, when the front vehicle wheel 28 returns to its normal position, the stability arms 36, 38 rotate back into retracted positions (FIGS. 2 and 4). In this way, the retracted stability arms 36, 38 are not in positions where they will strike low-profile objects in the path of the scooter vehicle.

If it is desired to maintain the stability arms 36, 38 in fully extended positions, a pin 71 (FIG. 3) may be inserted through an aperture (not shown) in a locking extension piece 70 extending from the frame 30 and through one of the apertures 56 (FIGS. 4 and 5) in pivot lever 54. When the stability arms are locked in fully extended positions, the linkage assembly 61 must be removed in order to be able to turn the front vehicle tire 28 and steer the vehicle.

The sensitivity of the automatically deployable vehicle stabilization system 34 can be adjusted with relative ease. The pivot lever 54 of the linkage assembly 34 includes a plurality of mounting apertures 56 (FIGS. 4 and 5) through which the stem piece 57 can be mounted. Changing the mounting location of the stem piece 57 relative to the pivot lever 54 will adjust the effective length of the lever created by the linkage assembly 34, thereby adjusting the sensitivity of stabilization system to turning of the front vehicle tire 28.

Figure 6:
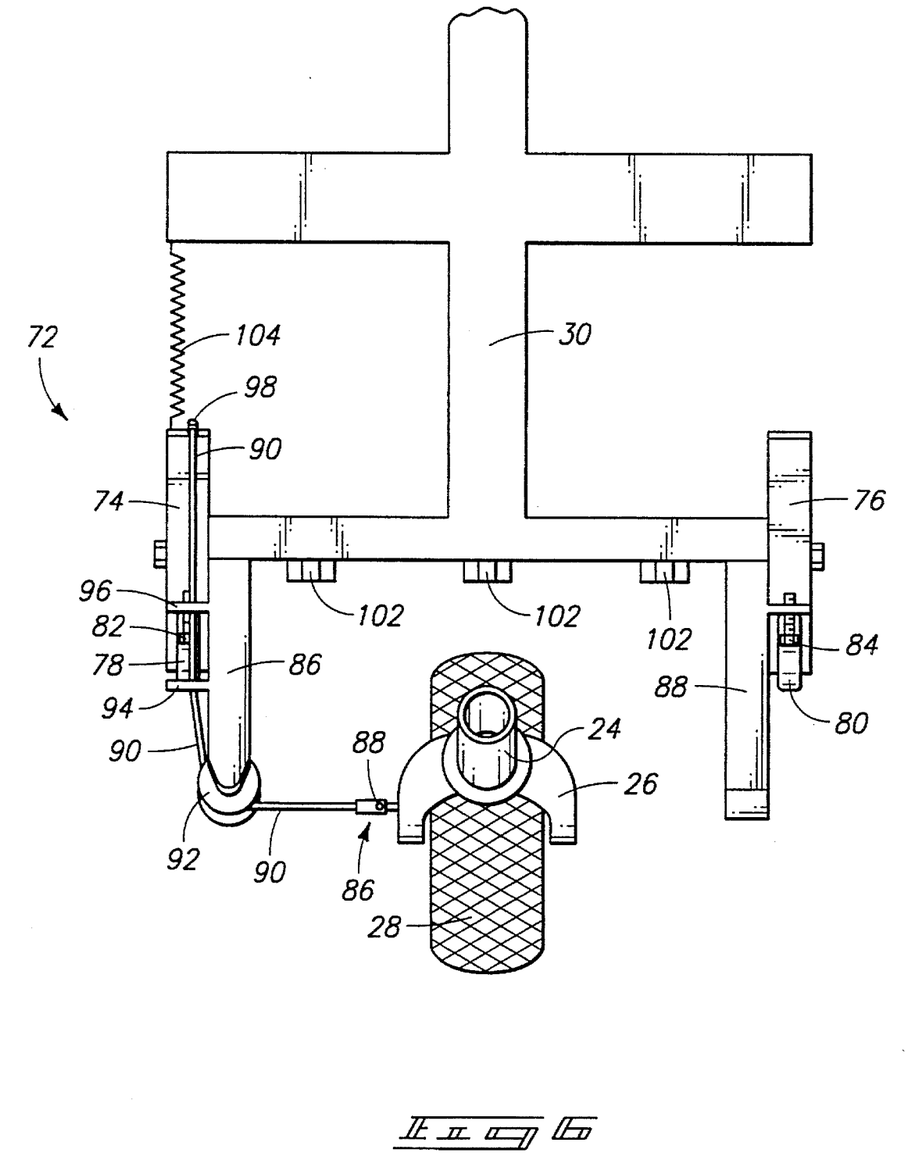
FIG. 6 is a top view of a second embodiment of an automatically deployable vehicle stabilization system according to the present invention.

FIG. 6 shows a second preferred embodiment of an automatically deployable vehicle stabilization system 72. The vehicle stabilization system 72 includes a first stability arm 74 and a second stability arm 76. The stability arms 74, 76 are rotatably coupled to the vehicle frame 30. Stability wheels 78, 80 are coupled to distal ends of stability arm 74 and stability arm 76, respectively. A first stop member 82 and a second stop member 84 are threadably connected to the frame 30 through respective flanges (only flange 96 is numbered) extending from a first frame extension member 86 and a second frame extension member 88. The adjustable stops 82, 84 provide abutment surfaces for engagement by the stability arms 74, 76 when in fully extended positions. As such, the positions of the adjustable stops 82, 84 define the fully extended positions of the stability arms 74, 76.

The stability arms 74, 76 are fixedly coupled to a pivot bar 100, which is rotatably coupled, in turn, to the frame 30 by means of support members 102. Any conventional means can be incorporated into the support members 102 to rotatably support the pivot bar 100. As such, rotation of stability arm 74 causes the pivot bar 100 and stability arm 76 to rotate simultaneously.

A first end of a cable 90 is coupled to the front fork 26 by means of a pivotable cable connection 88. The cable connection 88 allows the position of the cable 90 to pivot relative to the front fork 26 about pivot point 88. The cable 90 is entrained around a pulley 92, and passes through apertures (not shown) in flanges 94, 96 extending from frame extension member 86. A second end of cable 90 is attached to the proximal end of stability arm 74 through a cable connector 98.

A spring bias member 104 is connected between the frame 30 and the proximal end of stability arm 74. The spring member urges the stability arm 74 (and also the interconnected stability arm 76) to a retracted position to take up any slack in cable 90 when the front vehicle tire 28 is in its normal position. The sensitivity of the cable to turning of the front vehicle wheel 28 can be adjusted by varying the tension in cable 90 (e.g., by shortening or lengthening the cable).

Figure 7:
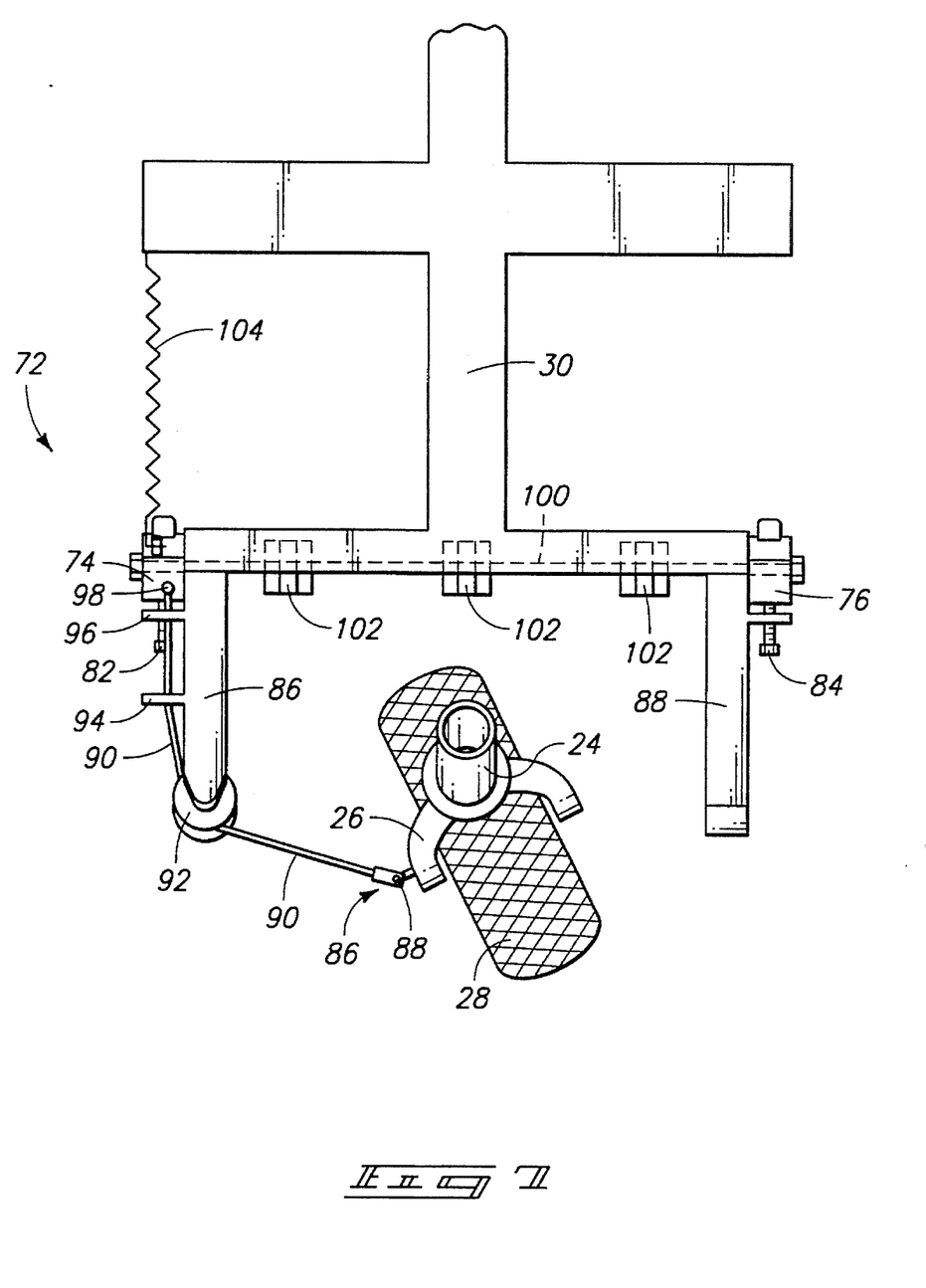
FIG. 7 is another top view of the vehicle stabilization system of FIG. 6 showing the front wheel in a turned position.

When the front vehicle wheel 28 is turned in either direction (e.g., as in FIG. 7), increased tension on the cable 90 causes the first stability arm 74, the pivot bar 100, and the second stability arm 76 to rotate. At fully extended positions, the stability arms 74, 76 will engage adjustable stops 82, 84. When the front vehicle tire is returned to its normal position (FIG. 6), the stability arms 74, 76 will rotate back to retracted positions as a result of the bias force exerted by spring member 104.

Figure 8:
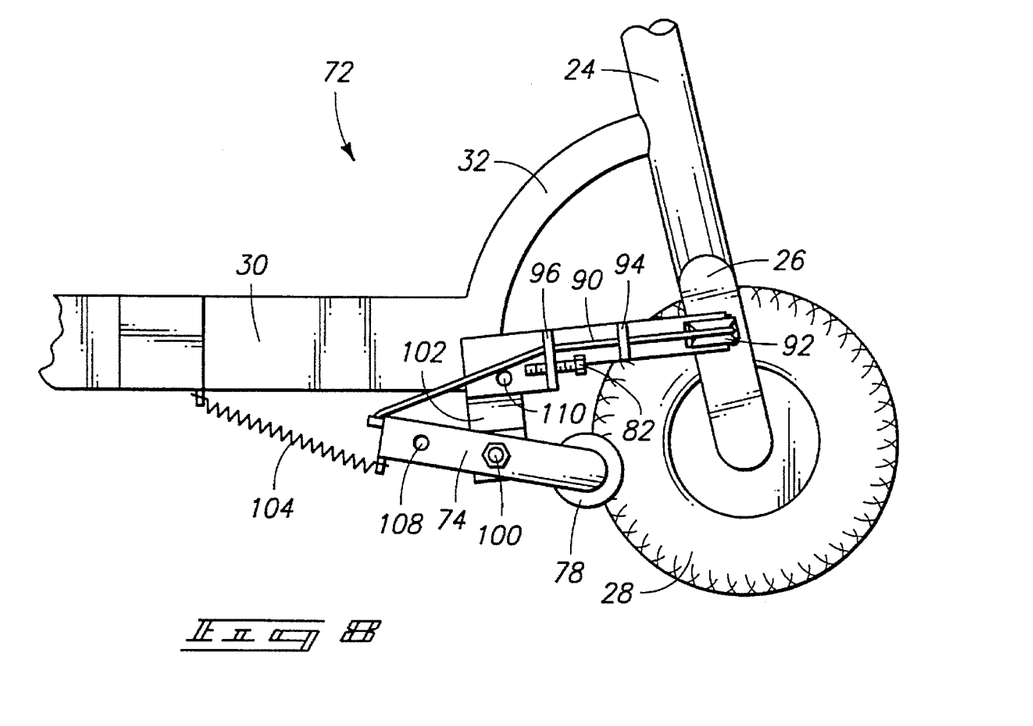
FIG. 8 is a side elevation view of the vehicle stabilization system of FIG. 6.
Figure 9:
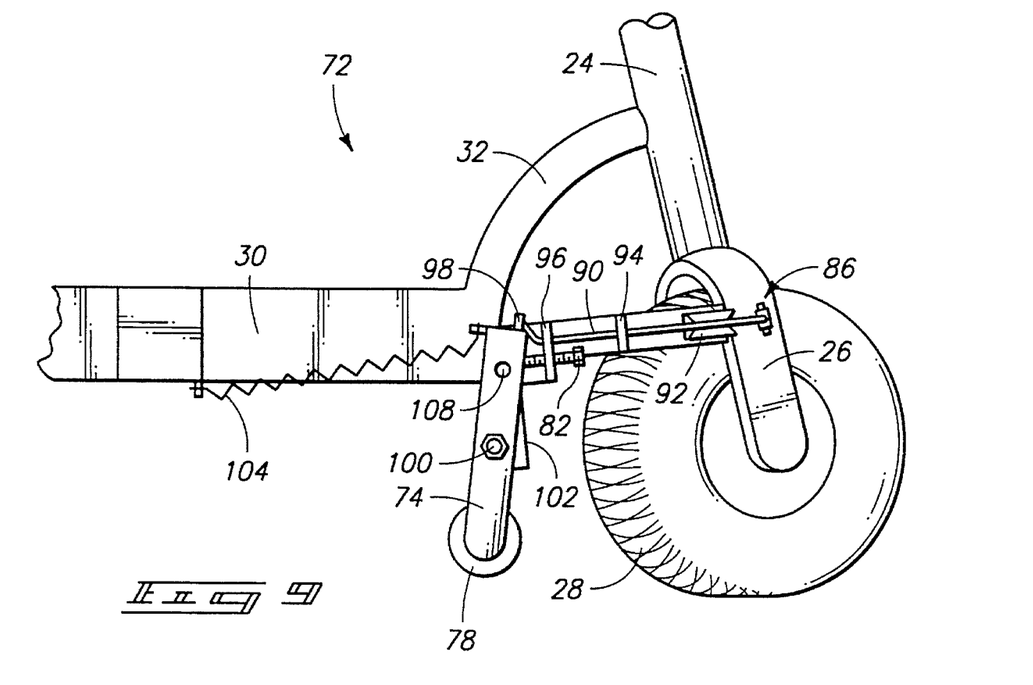
FIG. 9 is a side elevation view of the vehicle stabilization system of FIG. 7.
Figure 10:
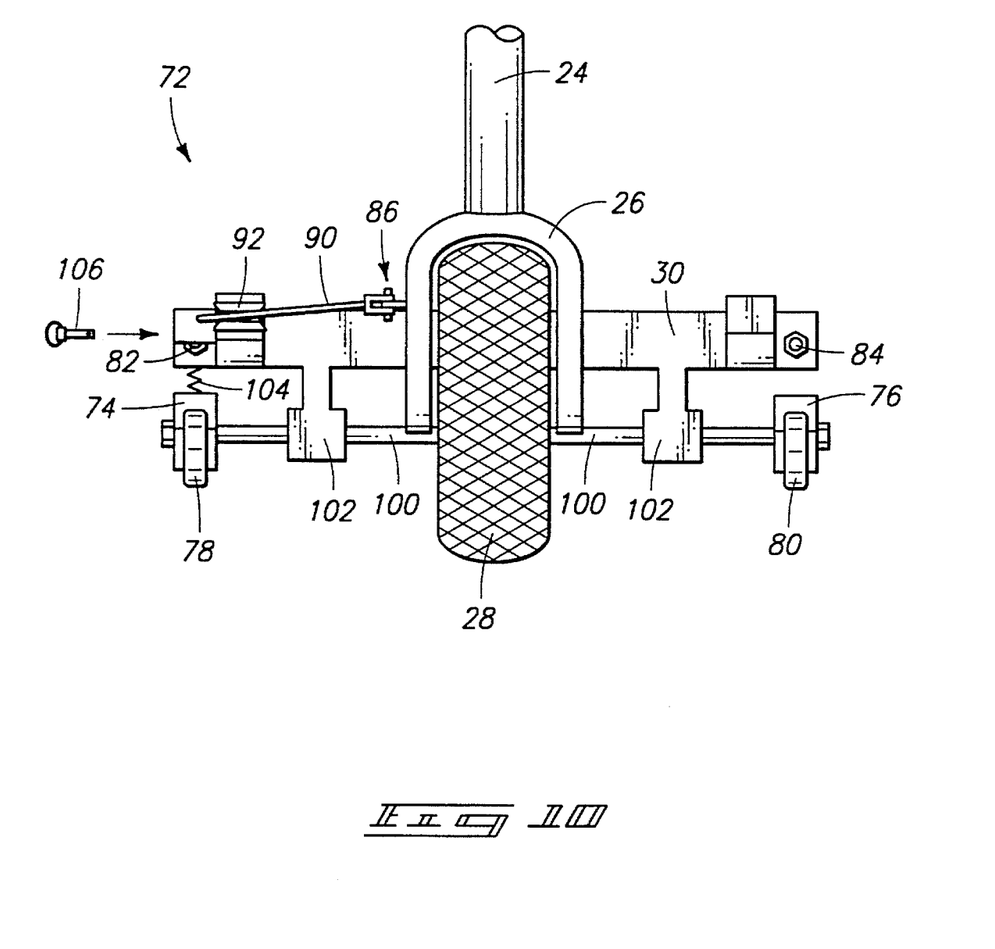
FIG. 10 is a front view of the vehicle stabilization system of FIG. 6.

If it is desired to secure the stability arms 74, 76 in fully extended positions, a pin 106 (FIG. 10) can be inserted through an aperture 108 in the stability arm 74 and through an aperture 110 (FIG. 8) in frame extension member 86. Apertures 108 and 110 are aligned when the arm 74 is in a fully extended position, as shown in FIG. 9.

The embodiments shown and described herein are provided as examples only of specific, preferred manners of carrying out the invention. Indeed, the disclosed embodiments show but two ways to provide extendible and retractable stability arms for use in connection with a scooter vehicle. It is to be understood that the extension arms could be engineered, for example, to telescopically extend from the frame to provide a suitable vehicle stability system.

Also, the two preferred embodiments are shown to involve linkage and cable drive mechanisms only. It is also to be understood, however, other drive mechanisms (e.g., a hydraulic drive mechanism, a magnetic cylinder mechanism, etc.) could be utilized to move the stability arms between extended and retracted positions. Further, each of the drive mechanisms has a level of sensitivity corresponding to an amount of movement of the front vehicle wheel assembly. The level of sensitivity of each type of drive mechanism can be adjusted, similar to the manners described above in connection with the linkage drive mechanism and the cable drive mechanism.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An automatically deployable vehicle stabilization system, comprising:

a vehicle frame;

a front vehicle wheel assembly coupled to the vehicle frame;

a pair of stability arms operatively coupled to the vehicle frame, the arms being movable between retracted and extended positions, the stability arms preventing the vehicle from overturning when in extended positions;

a drive mechanism operatively coupled to the front vehicle wheel assembly, the drive mechanism moving the stability arms into extended positions when the wheel assembly is positioned to turn the vehicle.

2. An automatically deployable vehicle stabilization system according to claim 1 wherein the stability arms are pivotally coupled to the vehicle frame, the stability arms being pivotal between extended and retracted positions.

3. An automatically deployable vehicle stabilization system according to claim 1, further comprising:

a steering column connected to the front wheel assembly;

a pivot bar rotatably supported by the vehicle frame, the stability arms being fixedly coupled to the pivot bar, the stability arms being pivotable between extended and retracted positions upon rotation of the pivot bar;

wherein the drive mechanism comprises a linkage assembly interconnecting the steering column and the pivot bar such that movement of the steering column to turn the vehicle causes the linkage to rotate the pivot bar and pivot the stability arms between extended and retracted positions.

4. An automatically deployable vehicle stabilization system according to claim 3 wherein the linkage assembly comprises:

a pivot lever fixedly coupled to the pivot rod;

a first ball-and-socket connection coupled to the pivot lever;

an adjustable control rod coupled at one end to the first ball-and-socket connection;

a second ball-and-socket connection attached to the control rod opposite the first ball-and-socket connection;

a steering column extension member fixedly coupled at one end to the steering column and pivotally and rotatably coupled at another end to the second ball-and-socket connection.

5. An automatically deployable vehicle stabilization system according to claim 3 wherein the drive mechanism includes a level of sensitivity to turning of the front vehicle wheel assembly, and wherein the level of sensitivity is adjustable.

6. An automatically deployable vehicle stabilization system according to claim 1 wherein each stability arm has a proximal end and a distal end, the stability arms further comprising respective stability wheels rotatably coupled to the respective distal ends thereof.

7. An automatically deployable vehicle stabilization system according to claim 1, further comprising respective stops, the stability arms engaging the stops at fully extended positions.

8. An automatically deployable vehicle stabilization system according to claim 7 wherein the stops are adjustable.

9. An automatically deployable vehicle stabilization system according to claim 1, further comprising:

a steering column connected to the front wheel assembly;

a pivot bar rotatably supported by the vehicle frame, the stability arms being fixedly coupled to the pivot bar, the arms being pivotable between extended and retracted positions upon rotation of the pivot bar;

wherein the drive mechanism comprises a cable coupled between the steering column and one of the stability arms such that rotation of the steering column causes the cable to pivot said one of the stability arms thereby rotating the pivot bar and pivoting the other of the stability arms such that the stability arms are moveable between extended and retracted positions.

10. An automatically deployable vehicle stabilization system according to claim 9, further comprising a biasing spring member connected between said one of the stability arms and the frame, the spring member urging the stability arms toward retracted positions when the vehicle wheel is in a normal position.

11. An automatically deployable vehicle stabilization system according to claim 9 wherein the drive mechanism includes a level of sensitivity to turning of the front vehicle wheel assembly, and wherein the level of sensitivity is adjustable.

12. An automatically deployable vehicle stabilization system according to claim 1, further comprising means for locking the stability arms in extended positions.

13. An automatically deployable vehicle stabilization system, comprising:

a pair of stability arms attachable to a vehicle frame, the arms being movable between retracted and extended positions, the stability arms preventing the vehicle from overturning when in extended positions;

a drive mechanism operatively coupled to a front vehicle wheel assembly, the drive mechanism moving the stability arms into extended positions when the wheel assembly is positioned to turn the vehicle.

14. An automatically deployable vehicle stabilization system according to claim 13 wherein the stability arms are pivotally attachable to the vehicle frame.

15. An automatically deployable vehicle stabilization system according to claim 14 wherein the drive mechanism comprises a linkage system.

16. An automatically deployable vehicle stabilization system according to claim 14 wherein the drive mechanism comprises a cable system.

17. An automatically deployable vehicle stabilization system according to claim 13 wherein the drive mechanism has a level of sensitivity corresponding to an amount of movement of the front vehicle wheel assembly, and wherein the level of sensitivity is adjustable.

18. An automatically deployable vehicle stabilization system according to claim 13, further comprising respective stops for the stability arms, the stops defining extending positions of the stability arms.

19. An automatically deployable vehicle stabilization system according to claim 18 wherein the stops are adjustable to vary the extended positions of the stability arms.

20. An automatically deployable vehicle stabilization system according to claim 13, further comprising means for locking the stability arms in extended positions.

* * * * *